United States Patent [19]

Takahashi et al.

[11] Patent Number: 4,853,351

[45] Date of Patent: * Aug. 1, 1989

[54] SILICA SHAPED BODIES AND PROCESS FOR PREPARING SAME

[75] Inventors: Akira Takahashi, Kagamihara; Kazuo Shibahara; Katsuhiro Morimoto, both of Gifu; Hiromasa Samma, Ogaki; Kazuhiko Kubo, Gifu, all of Japan

[73] Assignee: Kabushiki Kaisha Osaka Packing Seizosho, Osaka, Japan

[*] Notice: The portion of the term of this patent subsequent to Mar. 3, 2004 has been disclaimed.

[21] Appl. No.: 53,294

[22] PCT Filed: Sep. 6, 1985

[86] PCT No.: PCT/JP85/00499

§ 371 Date: Apr. 28, 1987

§ 102(e) Date: Apr. 28, 1987

[87] PCT Pub. No.: WO87/01370

PCT Pub. Date: Mar. 12, 1987

[51] Int. Cl.$^4$ .............................................. C04B 35/15
[52] U.S. Cl. .................................... 501/87; 501/96; 501/94; 501/154; 501/133; 501/123; 428/312.6
[58] Field of Search ............................ 501/133, 87–90, 501/94, 96, 99, 154, 123; 428/312.6

[56] References Cited

U.S. PATENT DOCUMENTS

| | | | |
|---|---|---|---|
| 4,162,924 | 7/1979 | Kubo et al. | 106/120 |
| 4,230,765 | 10/1980 | Takahashi et al. | 106/288 B |
| 4,298,386 | 11/1981 | Kubo et al. | 501/80 |
| 4,455,246 | 6/1984 | Schmidt et al. | 501/133 |
| 4,476,234 | 10/1984 | Jones et al. | 501/133 |
| 4,647,499 | 3/1987 | Takahashi et al. | 106/120 |
| 4,656,146 | 4/1987 | Schlett et al. | 501/133 |

*Primary Examiner*—William R. Dixon, Jr.
*Assistant Examiner*—Andrew B. Griffis
*Attorney, Agent, or Firm*—Armstrong, Nikaido, Marmelstein & Kubovcik

[57] ABSTRACT

A silica shaped body comprising a multiplicity of interconnected secondary particles of amorphous silica, voids interspersed between the secondary particles, and at least one inorganic inactive substance selected from among carbonaceous substance, carbide, nitride and metallic oxide and physically united with the secondary particles, is prepared by containing a siliceous material, calcareous material and water to a hydrothermal synthesis reaction with heating and stirring under an elevated pressure to obtain an aqueous slurry of secondary particles of calcium silicate crystals, followed by carbonation, shaping and drying.

4 Claims, 2 Drawing Sheets

SILICA SHAPED BODIES AND PROCESS FOR PREPARING SAME

FIELD OF THE INVENTION

This invention relates to novel silica shaped bodies having improved heat insulating properties and a process for preparing the same.

DESCRIPTION OF RELATED ART

Silica heat insulating materials are required to have various properties such as lightweight properties, excellent heat insulating properties, high fire resistance, sufficiently high strength to withstand handling and shaking, etc. In recent years, there is a great demand for materials of improved heat insulating properties.

Processes are known for improving heat insulating properties by incorporating an opacifier into silica heat insulating materials. For example, British Patent No. 1205572 discloses a heat insulating material comprising microporous silica aerogel particles and an opacifier both supported by a fibrous material. British Patent No. 1350661 describes the foregoing heat insulating material enclosed with a bag of fiber-glass cloth or the like. Although outstanding in heat insulating properties, these heat insulating materials have the drawbacks of being extremely low in strength and finding a limited use.

SUMMARY OF THE INVENTION

It is an object of this invention to provide a novel silica shaped body which has outstanding heat insulating properties over a wide temperature range of low to high temperatures and is lightweight and also a process for preparing the shaped body.

It is another object of the invention to provide a novel silica shaped body which has outstanding heat insulating properties over a wide temperature range and is lightweight while retaining fully satisfactory strength for use and also a process for preparing the shaped body.

Other features of the present invention will become more apparent from the following description.

This invention provides a silica shaped body comprising a multiplicity of interconnected secondary particles of amorphous silica, voids interspersed between the secondary particles, and at least one inorganic inactive substance selected from among carbonaceous substance, carbide, nitride and metallic oxide and physically united with the secondary particles.

Our research has revealed that when a shaped body of secondary particles of amorphous silica already developed by the applicant and disclosed in U.S. Pat. No. 4230765 comprises a large number of interconnected secondary particles of amorphous silica and at least one inorganic inactive substance selected from among carbonaceous substance, carbide, nitride and metallic oxide and physically united with the secondary particles, the shaped body has the following characteristics;

(1) despite the presence of the above-specified inactive substance, the shaped body retains fully satisfactory strength for use and is lightweight, (2) the shaped body has improved heat insulating properties over a wide temperature range of low to high temperatures, afforded by the presence of the inactive substance and (3) the shaped body has remarkably improved heat insulating properties at high temperatures of at least 200° C.

DESCRIPTION OF PREFERRED EMBODIMENTS

Figure 1:
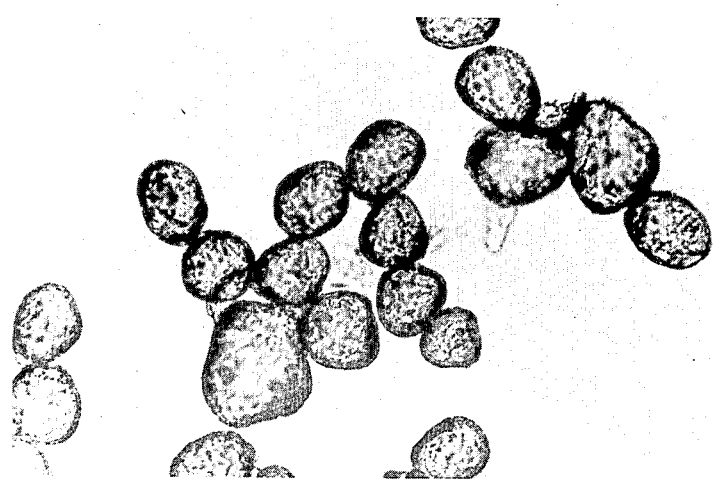
FIG. 1 is a photomicrograph of a prior art, rutile-free crystal slurry.

The silica shaped body of this invention can be produced, for example, by adding the above-specified inactive substance to the starting slurry to be subjected to a hydrothermal synthesis reaction in the process disclosed in U.S. Pat. No.4230765 for preparing a shaped body of secondary particles of amorphous silica.

The process of the above U.S. patent comprises subjecting a starting slurry containing a siliceous material, calcareous material and water to a hydrothermal synthesis reaction with heating and stirring under an elevated pressure to prepare an aqueous slurry of secondary particles of calcium silicate crystals, followed by any one of the following steps:

(a) contacting the aqueous slurry of secondary particles of calcium silicate crystals with carbon dioxide, treating the carbonated product with an acid, shaping and drying the acid-treated product, (b) contacting the aqueous slurry of secondary particles of calcium silicate crystals with carbon dioxide, shaping and drying the carbonated product, treating the shaped body thus obtained with an acid and drying the shaped body, and (c) shaping and drying the aqueous slurry of secondary particles of calcium silicate crystals, contacting the shaped body thus obtained with carbon dioxide in the presence of water, treating the shaped body with an acid and drying the shaped body.

The present invention also provides a process for preparing a silica shaped body in accordance with the above U.S. patent, the process being characterized in that the starting slurry used in the process described in the U.S. patent contains at least one inorganic inactive substance selected from among carbonaceous substance, carbide, nitride and metallic oxide chemically inert to the reaction involved in the process.

Our research has matured into the following novel findings:

(1) when the above-specified inactive substance (hereinafter referred to as "inactive substance") is present in the starting slurry to be subjected to a hydrothermal synthesis reaction, the secondary particles of calcium silicate crystals prepared are physically united with the inactive substance, (2) when the secondary particles of calcium silicate crystals have been contacted with carbon dioxide for carbonation and treated with an acid to transform into secondary particles of amorphous silica, the inactive substance remains physically united with the secondary particles of amorphous silica, and (3) thereby a silica shaped body is prepared which has improved heat insulating properties over a wide temperature range while retaining fully satisfactory strength for use.

The silica shaped body of this invention, which has fully satisfactory strength for use, has over a wide temperature range of low to high temperatures significantly improved heat insulating properties and greatly reduced thermal conductivity particularly at 200° C. or higher, afforded by the presence of the inactive substance.

The shaped body of this invention has a structure in which the inactive substance is present in a special state in the shaped body set forth in U.S. Pat. No. 4230765. According to this invention, the inactive substance is physically united with the secondary particles of amorphous silica in the shaped body consisting essentially of a multiplicity of interconnected secondary particles of amorphous silica and voids interspersed therebetween. The presence of the inactive substance in this way leads to a shaped body having improved heat insulating properties over a wide temperature range while retaining fully satisfactory strength for use.

The secondary particles of amorphous silica can be obtained by chemically converting the secondary particles of calcium silicate crystals and assumes the same configuration as that of the particles of calcium silicate crystals to be converted. The secondary particles of amorphous silica are each in the form of a substantially globular shell formed of three-dimensionally interlocked primary particles of amorphous silica and having an outside diameter of about 5 to about 150 μm. The secondary particles of amorphous silica have a great specific surface area of about 250 to about 600 m$^2$/g as measured by nitrogen adsorption method (BET method) and a high oil adsorption of about 500 to about 1200 cc/100 g as measured using dioctyl phthalate according to the pigment test method of JIS K 5101. Further the secondary particles of amorphous silica are so outstanding in shapability that shaped bodies of high mechanical strength can be produced merely by shaping and drying the aqueous slurry of secondary particles without using a binder.

The primary particles of amorphous silica retain, without entailing a substantial change, the original configuration of calcium silicate crystals from which the primary particles of amorphous silica are derived. More specifically, the primary particles of amorphous silica maintain the chain structure of SiO$_4$ tetrahedrons which is the skeletal structure of primary particles of calcium silicate crystals constituting the secondary particles thereof used as the starting material. The primary particles of amorphous silica have a great specific surface area of about 250 to about 600 m$^2$/g as measured by nitrogen adsorption method (BET method) and a high oil adsorption of about 300 to about 900 cc/100 g as measured using dioctyl phthalate according to the pigment test method of JIS K 5101. Moreover, the primary particles of amorphous silica have a high purity of SiO$_2$, i.e. SiO$_2$ content of at least 98% by weight according to a chemical analysis after ignition dehydration.

The secondary particles of amorphous silica are present in the shaped body as compressed in at least one direction by the shaping pressure. The inactive substance is physically united with the secondary particles of amorphous silica as enclosed therein.

An observation under an optical microscope as well as under a scanning electron microscope reveals that the shaped body of this invention has the structure as described above.

Figure 2:
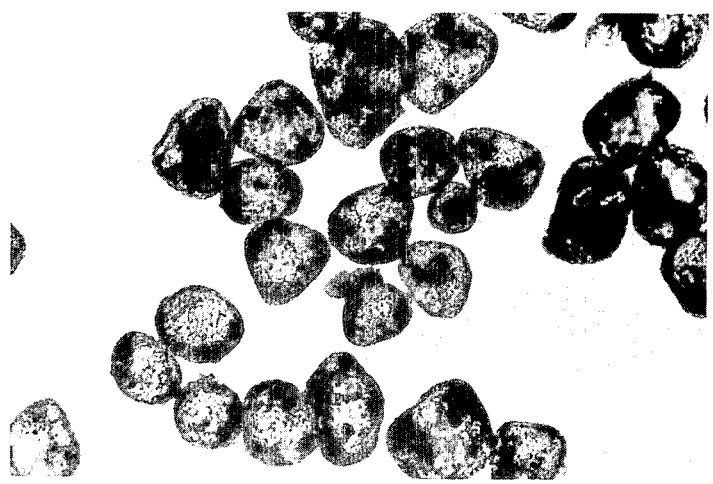
FIG. 2 is a photomicrograph of a crystal slurry according to the present invention.
Figure 3:
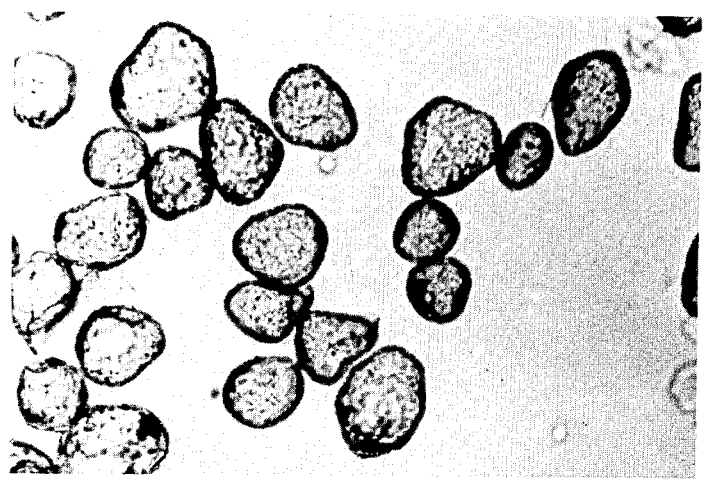
FIG. 3 is a photomicrograph of a prior art rutile-free slurry of secondary particles of amorphous silica.
Figure 4:
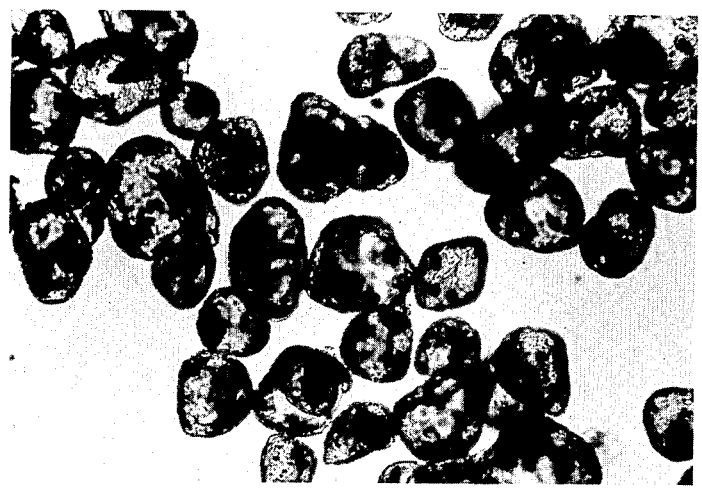
FIG. 4 is a photomicrograph of secondary particles of amorphous silica containing rutile according to the present invention.

The above mode in which the inactive substance is present is attributable to the fact that the inactive substance, which is added to the aqueous slurry before the hydrothermal synthesis reaction to be conducted with stirring, is physically united with the secondary particles of calcium silicate crystals as enclosed therein, when the secondary particles of calcium silicate crystals are formed, and that the inactive substance remains physically united with the secondary particles after conversion of secondary particles of calcium silicate crystals to those of amorphous silica. This is apparent from optical microscopic and scanning electron microscopic observations of the aqueous slurry of secondary particles of calcium silicate crystals prepared by the hydrothermal synthesis reaction and the aqueous slurry of secondary particles of amorphous silica given by conversion of secondary particles of calcium silicate crystals, e.g. from FIGS. 1, 2, 3 and 4. FIGS. 1 and 3 are optical photomicrographs (each 250 X) showing the secondary particles of calcium silicate crystals in an aqueous slurry which is free of inactive substance and the secondary particles of amorphous silica prepared by conversion of the secondary particles of calcium silicate crystals and present in an aqueous slurry, respectively (those as used in preparing specimen No. 1 of shaped body and serving as a control in Example 1). FIGS. 2 and 4 are optical photomicrographs (each 250 X) showing the secondary particles of calcium silicate crystals obtained with addition of rutile as the inactive substance before hydrothermal synthesis reaction according to this invention and present in an aqueous slurry and the secondary particles of amorphous silica obtained by conversion of secondary particles of calcium silicate crystals and present in an aqueous slurry, respectively (those used in preparing specimen No. 5 of shaped body in Example 1). FIGS. 3 and 4 show that when the secondary particles of calcium silicate crystals obtained by addition of rutile to the starting slurry before the hydrothermal synthesis reaction have been converted to the secondary particles of amorphous silica, the rutile is physically united with the secondary particles of amorphous silica as enclosed therein. The rutile is not physically united with the secondary particles when added after the hydrothermal synthesis reaction.

The amount of the inactive substance in the shaped body of this invention can be suitably determined over a wide range, but is usually about 2 to about 70% by weight, preferably about 5 to about 60% by weight, more preferably about 10 to about 50% by weight, based on the total solids of shaped body. If over 2% by weight is present, improved heat insulating properties result at high temperatures of 200° C. or higher. With 5 to 60% by weight present, remarkably improved heat insulating properties are achieved over a wide temperature range of low to high temperatures. Below 2% by weight, a sufficient improvement in heat insulating properties are not available. Above 70% by weight, radiation heat transfer is inhibited but increased heat transfer through the solid of the inactive substance occurs to result, as a whole, in an insufficient improvement of heat insulating properties and in reduction of bending strength of shaped body, and difficulty is further encountered in giving lightweight shaped bodies, hence objectionable.

The shaped body of the present invention is prepared basically by the same process as those disclosed in U.S. Pat. No. 4230765 with the exception of using the inactive substance.

According to the process, an aqueous slurry of secondary particles of calcium silicate crystals is prepared by subjecting a starting slurry containing a siliceous material, calcareous material, water and inactive substance to a hydrothermal synthesis reaction with stirring and with heating under an elevated pressure.

Any of siliceous materials used in the art for producing calcium silicate shaped bodies is advantageously usable as such in the present invention. Examples of the materials are crystalline siliceous materials such as siliceous stone, siliceous sand, etc., and amorphous siliceous materials such as silica gel, silica flour (e.g. ferrosilicon dust, etc.), white carbon, diatomaceous earth, silica obtained by reacting aluminum hydroxide with hydrosilicofluoric acid resulting as a by-product from the wet process for preparing phosphoric acid, etc. The calcareous materials useful in the present invention can be any of those heretofore used, such as quick lime, slaked lime, carbide residuum, etc.

The $CaO/SiO_2$ mole ratio of the calcareous material to siliceous material is generally from about 0.5 to about 1.5, e.g. about 0.70 to about 0.90 in synthesis of tobermorite crystals, about 0.90 to about 1.15 in synthesis of xonotlite crystals and about 1.1 to about 1.5 in synthesis of foshagite crystals.

The inactive substance to be used in this invention is at least one of carbonaceous substances, including carbides, nitrides and metallic oxides which are all chemically inactive under reaction conditions in the hydrothermal synthesis reaction and the reaction for conversion of secondary particles of calcium silicate crystals to those of amorphous silica in the process of the invention. Specific examples of useful inactive substances are carbonaceous materials such as active carbon, charcoal, coal, carbon black and graphite, carbides such as silicon carbide, boron carbide and titanium carbide., nitrides such as silicon nitride, boron nitride and titanium nitride., and metallic oxides such as iron oxides (hematite, magnetite, etc.), titanium oxides (rutile, etc.), tin oxides, manganese oxides, cerium oxides, zirconium oxides, ilmenite, zircon and chromite. These substances are usable singly, or at least two of them can be used in mixture. It is suitable that the inactive substance be usually about 0.001 to about 120 $\mu$m, preferably about 0.001 to about 100 $\mu$m, in particle size.

The amount of the inactive substance used in this invention is not critically specified but is such that the shaped body contains about 2 to about 70% by weight, preferably about 5 to about 60% by weight, more preferably about 10 to about 50% by weight, based on the total solids of shaped body.

According to this invention, it is required to incorporate the inactive substance into the starting slurry to be subjected to a hydrothermal synthesis reaction. This permits the presence of the inactive substance without entailing a great reduction in strength. The inactive substance, when added after the reaction, results in a shaped body having markedly reduced strength, e.g. bending strength.

The starting slurry may incorporate known additives. Examples of such additives are inorganic fibrous materials such as asbestos and rock wool.

The amount of water used for preparing the starting slurry is at least 5 times, preferably about 10 to about 50 times, the amount by weight of the solids of starting slurry. When a lightweight body of about 0.1 g/cm³ in bulk density is to be produced, it is suitable that the amount be about 15 to about 50 times, preferably about 20 to about 40 times, the amount by weight of the slurry solids.

The starting slurry thus prepared is then subjected to a hydrothermal synthesis reaction with stirring. The reaction is conducted at a saturated water vapor pressure of usually at least about 4 kg/cm², preferably about 6 to about 30 kg/cm². This reaction produces a slurry of secondary particles having an outside diameter of about 5 to about 150 $\mu$m and composed predominantly of three-dimensionally interlocked calcium silicate crystals such as tobermorite crystals, xonotlite crystals, foshagite crystals, etc. The inactive substance coexisting in the starting slurry are physically united with the secondary particles as enclosed therein. In short, the reaction gives the slurry containing the secondary particles of calcium silicate crystals which have the inactive substance as physically united therewith and which are uniformly dispersed in water.

According to this invention, the secondary particles of calcium silicate crystals physically united with the inactive substance are contacted with carbon dioxide for carbonation and treated with an acid to undergo chemical conversion into secondary particles of amorphous silica. The carbonation and acid treatment can be conducted at any stage of the procedures including the shaping and drying steps. More specifically, the slurry of secondary particles of calcium silicate crystals is subjected to any one of the following procedures to afford the desired shaped body:

(a) the slurry of secondary particles of calcium silicate crystals is contacted with carbon dioxide, treated with an acid, shaped and dried, thereby giving a shaped body of secondary particles of amorphous silica, (b) the slurry of secondary particles of calcium silicate crystals is contacted with carbon dioxide, shaped and dried, and the shaped body thus obtained is treated with an acid and dried, thereby giving a shaped body of secondary particles of amorphous silica, and (c) the slurry of secondary particles of calcium silicate crystals is shaped and dried, and the shaped body thus obtained is contacted with carbon dioxide in the presence of water, treated with an acid, and dried, thereby giving a shaped body of secondary particles of amorphous silica.

Given below is a detailed description of the process for chemically converting the secondary particles of calcium silicate crystals into those of amorphous silica. The carbonation of secondary particles of calcium silicate crystals is conducted by introducing carbon dioxide into the reaction system to contact the secondary particles with the carbon dioxide in the presence of water. For example, the carbonation is effected by placing the slurry of secondary particles of calcium silicate crystals obtained above into a suitable closed container and introducing carbon dioxide into the container preferably with stirring, or placing the shaped body obtained by shaping and drying the slurry of secondary particles into a suitable closed container and introducing carbon dioxide into the container at high humidity or in wet atmosphere, or by introducing carbon dioxide into water or carbonated water in which the shaped body has been immersed. Insofar as carbon dioxide gas is introduced into the reaction system, the carbonation will proceed satisfactorily at room temperature under atmospheric pressure. However, it is preferred to effect the carbonation under an increased pressure, whereby the reaction can be completed in a shorter time at an accelerated velocity. The velocity of carbonation varies to some extent with the kind of calcium silicate crystals in the form of secondary particles. When carbonating the secondary particles of xonotlite crystals which are carbonated at the lowest velocity, the reaction will be completed in about 4 to about 10 hours by using water in an amount of about 2 to about 6 times the weight of the particles. Further when the amount of water is 5 times as much, the reaction will be completed in about 1 hour under reaction pressure of 2 kg/cm² gauge, or in as short a period of time as about 30 minutes under reaction pressure of 3 kg/cm² gauge.

The carbonation results in conversion of calcium silicate crystals into composite particles of amorphous silica and microcrystalline calcium carbonate while retaining the original configuration of secondary particles of calcium silicate crystals without any substantial change of the configuration assumed before the carbonation by the primary particles of calcium silicate crystals constituting the secondary particles thereof. The composite particles resulting from the carbonation, in other words, maintain the chain structure of SiO₄ tetrahedrons possessed by the primary particles of calcium silicate crystals as the skeleton, and the chain structure leads to the formation of amorphous silica retaining the original configuration of calcium silicate crystals and finely divided calcium carbonate attached to the amorphous silica.

The carbonated product is then treated with an acid to remove the calcium carbonate. Either the slurry or shaped body may be subjected to the acid treatment. Preferred acids are those capable of reacting with the calcium carbonate to produce a water-soluble calcium salt which is readily removable.

Examples of useful acids are hydrochloric acid, nitric acid, acetic acid, perchloric acid, etc. When the aqueous slurry is treated with an acid, an acid gas such as hydrochloric acid gas is introduced into the slurry. The acid treatment of a shaped body is carried out by immersing the shaped body in a solution of acid such as hydrochloric acid or by introducing a hydrochloric acid gas or like acid gas into water in which the body has been immersed. The formation of calcium salt is completed in a very short period of time. The calcium salt thus formed can be removed by washing with water, whereby the secondary particles of amorphous silica are produced which have the same configuration as that of secondary particles of calcium silicate crystals.

The inactive substance is not subjected to substantial chemical change under the conditions during the carbonation and acid treatment, and remains physically united with the secondary particles of calcium silicate crystals thereunder. In other words, the inactive substance is physically united with the secondary particles of amorphous silica formed by the conversion as enclosed therein.

According to this invention, the slurry thus treated with the acid is shaped and dried, or alternatively the shaped body treated is dried, whereby the shaped body of this invention is prepared.

In the process of this invention, various additives, when required, may be further admixed with the slurry to be shaped. Examples of useful additives are fibers, clays, cements, binders, etc. The slurry is shaped by conventional methods, for example, by dewatering by press molding, centrifugation or the like.

When the shaped body of this invention is prepared by following the procedure (a), a shaped body of composite particles of silica, calcium silicate and inactive substance can be produced by adding, before shaping, an aqueous slurry of calcium silicate crystals specially prepared as required. Further, when required for example in effecting the procedure (a), the aqueous slurry of secondary particles of amorphous silica physically united with the inactive substance and prepared above is placed into a mold and press-formed on dewatering, and an aqueous slurry of secondary particles of calcium silicate crystals free from the inactive substance and obtained by a usual method is similarly press-formed in the mold over the resulting shaped body, or these procedures are performed in a reverse order, whereby a laminated shaped body can be prepared. Likewise, a laminated shaped body can be produced by separately molding the aqueous slurry containing the inactive substance and the aqueous slurry free of the inactive substance in the same manner as above in carrying out the procedure (b) or (c).

The shaped body of this invention thus obtained consists essentially of globular shell-like secondary particles of amorphous silica having an outside diameter of about 5 to about 150 μm and formed of primary particles thereof three-dimensionally interlocked, voids interspersed between the secondary particles, and an inactive substance physically united with the secondary particles as enclosed therein. Although having a low density, the shaped body retains fully satisfactory strength for use and has remarkably improved heat insulating properties over a wide temperature range, particularly at a high temperature of at least 200° C., afforded by the presence of the inactive substance.

According to this invention, desired silica shaped bodies can be easily produced with low to high densities. Among others, a lighweight shaped body of low density, e.g., having a bulk density of about 0.1 g/cm³ can be easily produced.

Best Mode for Carrying Out the Invention

The present invention will be described below in greater detail with reference to the following examples in which the parts and the percentages are all by weight. The properties were determined by the following methods.

(a) Bending strength: According to the method of JIS A 9510.

(b) Thermal conductivity: According to the hollow cylindrical method of JIS A 9510.

Example 1

Quick lime (CaO 95 %) was hydrated in hot water at 80° C. to obtain a milk lime. To the milk lime was added a powder of siliceous stone (SiO₂ 94 %), 7.0 μm in mean particle size, in the CaO/SiO₂ mole ratio of 1.00. Further added were water and titanium oxide powder (rutile, 2.3 μm in mean particle size) in such amount that the resulting shaped body would have a specified rutile content, affording a starting slurry containing water in 20 times the amount by weight of the solids. The slurry was subjected to a hydrothermal synthesis reaction in an autoclave at a saturated water vapor pressure of 12 kg/cm² and a temperature of 191° C. for 5 hours while being stirred by a stirrer which was rotated at 40 r.p.m. In this way, slurries of calcium silicate crystals were prepared.

Portions of the crystal slurries were dried at 100° C. for 24 hours and analyzed by an x-ray diffractometer. The analysis revealed the peak of xonotlite crystals in all slurries and further the peak of rutile crystals in the slurries containing titanium oxide particles.

When the crystal slurries were observed under an optical microscope as well as a scanning electron microscope, all the slurries were found to contain globular shell-like secondary particles having an outside diameter of 5 to 150 μm and composed of three-dimensionally interlocked xonotlite crystals. In the slurries containing titanium oxide particles, rutile crystals were found to have been physically united with the secondary particles of xonotlite crystals as enclosed therein.

FIGS. 1 and 2 show examples of optical photomicrographs. FIG. 1 is a photomicrograph (250 X) of a rutile-free crystal slurry (one used for producing specimen No. 1 of shaped body listed below in Table 1). FIG. 2 is a photomicrograph (250 X) of a crystal slurry obtained according to the present invention and containing rutile in such an amount as to give a rutile content of 33.8% based on the total solids of shaped body (one used for producing specimen No. 5 of shaped body shown below in Table 1). When compared with FIGS. 1 and 2, FIG. 2 shows that the rutile is physically united with secondary particles of xonotlite crystals as enclosed therein.

Subsequently the crystal slurries obtained above were carbonated and treated with an acid. The slurries were dewatered and dried to afford a water to slurry solids weight ratio of 1:1, and placed into a pressure container into which carbon dioxide was forced to an internal pressure of 3 kg/cm² to perform reaction for about 30 minutes. The reaction mixture was treated with a 3 N solution of hydrochloric acid for 5 minutes and fully washed with water to dissolve out the calcium chloride, thereby affording slurries of secondary particles of amorphous silica.

The slurries thus obtained were dried at 100° C. for 24 hours and analyzed by an x-ray diffractometer. The analysis revealed the broad peaks derived from the amorphous silica and exhibited by all slurries, and the peak of rutile crystals in the slurries containing titanium oxide particles.

The slurries obtained above were observed under an optical microscope and a scanning electron microscope and were found to contain a globular shell-like secondary particles of amorphous silica having an outside diameter of 5 to 150 μm and composed of primary particles thereof three-dimensionally interlocked with one another and retaining the original needle-like configuration of xonotlite crystals. It was also found that the slurries containing titanium oxide particles have the rutile crystals physically united with the secondary particles of amorphous silica as enclosed therein.

FIGS. 3 and 4 are examples of optical photomicrographs. FIG. 3 is a photomicrograph (250 X) of a rutile-free slurry of secondary particles of amorphous silica (one used for producing specimen No. 1 of shaped body shown below in Table 1). FIG. 4 is a photomicrograph (250 X) of a slurry of secondary particles of amorphous silica obtained by addition of rutile in an amount of 33.8% based on the total solids of shaped body according to this invention (one used for producing the specimen No. 5 of shaped body indicated below in Table 1). When compared with FIGS. 3 and 4, FIG. 4 reveals that the rutile is physically united with the secondary particles as enclosed therein.

Subsequently 7 parts of glass fibers and 3 parts of portland cement were added to 90 parts (solids) of each slurry of secondary particles of amorphous silica obtained above, and the mixture was pressed for dewatering and shaping and dried at 100° C. to obtain a tubular shaped body, 114 mm in inside diameter, 50 mm in wall thickness and 610 mm in length.

The shaped bodies thus prepared were checked for structure by observation under an optical microscope and a scanning electron microscope. All the bodies were found to have been composed of a multiplicity of interconnected secondary particles of amorphous silica. In the bodies containing titanium oxide particles, rutile crystals were physically united with the secondary particles as enclosed therein.

Table 1 below shows the properties of the shaped bodies obtained above.

TABLE 1

| Specimen No. | 1 | 2 | 3 | 4 | 5 | 6 | 7 | 8 | 9 |
|---|---|---|---|---|---|---|---|---|---|
| Rutile content (based on total solids of shaped body, %) | 0 | 5.3 | 15.0 | 24.6 | 33.8 | 44.1 | 56.0 | 64.9 | 74.3 |
| Properties of shaped body | | | | | | | | | |
| Bulk density (g/cm³) | 0.201 | 0.200 | 0.199 | 0.202 | 0.202 | 0.202 | 0.201 | 0.204 | 0.205 |
| Bending strength (kg/cm²) | 8.4 | 8.1 | 8.0 | 7.7 | 7.4 | 5.8 | 4.0 | 2.5 | 1.1 |
| Thermal conductivity (Kcal/m · hr · °C.) Mean temperature (°C.) | | | | | | | | | |
| 70 | 0.040 | 0.039 | 0.038 | 0.037 | 0.037 | 0.036 | 0.037 | 0.039 | 0.040 |
| 150 | 0.047 | 0.045 | 0.043 | 0.042 | 0.041 | 0.040 | 0.042 | 0.044 | 0.045 |
| 250 | 0.059 | 0.056 | 0.051 | 0.048 | 0.046 | 0.045 | 0.047 | 0.050 | 0.054 |
| 350 | 0.077 | 0.070 | 0.060 | 0.055 | 0.052 | 0.051 | 0.053 | 0.057 | 0.067 |

In Table 1, shaped body specimens Nos. 2 to 8 are according to this invention, while specimens No. 1 and No. 9 are shown for comparison.

Table 1 shows that the shaped bodies of the invention, ranging from 2 to 70% in rutile content based on the total solids of shaped body, have fully satisfactory strength for use and exhibited exceedingly reduced thermal conductivity over a wide temperature range compared with the rutile-free shaped body, specimen No. 1. Specimen No. 9 with a rutile content of over 70% is insufficient in the reduction of thermal conductivity and has exceedingly low bending strength, hence unsuitable for use.

EXAMPLE 2

The general procedure of Example 1 was repeated with the exception of using the inactive substances shown below in Table 2 in place of the titanium oxide used in Example 1, whereby shaped bodies were produced which had the same shape as those of the specimens obtained in Example 1.

The specimens thus obtained were observed under an optical microscope and a scanning electron microscope to check them for structure and were found to have been composed of a multiplicity of interconnected secondary particles of amorphous silica. The specimens containing the inactive substance were found to have the inactive substance physically united with the secondary particles as enclosed therein.

Table 2 below shows the properties of the shaped bodies thus obtained.

TABLE 2

| Specimen No. | 10 | 11 | 12 | 13 | 14 | 15 | 16 | 17 | 18 |
|---|---|---|---|---|---|---|---|---|---|
| Inactive substance | | | | | | | | | |
| Kind | None | Iron oxide (Hematite) | None | Iron oxide (Hematite) | Graphite | Silicon carbide | Silicon nitride | Ilmenite | Cerium oxide |
| Mean particle size ($\mu$m) | — | 0.51 | — | 0.51 | 7.5 | 3.5 | 5.0 | 4.0 | 2.0 |
| Content (based on total solids of shaped body, %) | 0 | 33.5 | 0 | 33.4 | 33.6 | 33.7 | 33.5 | 33.9 | 33.8 |
| Properties of shaped body | | | | | | | | | |
| Bulk density (g/cm$^3$) | 0.101 | 0.103 | 0.200 | 0.201 | 0.200 | 0.199 | 0.198 | 0.201 | 0.198 |
| Bending strength (kg/cm$^2$) | 4.0 | 3.5 | 8.5 | 7.4 | 7.2 | 7.6 | 7.4 | 7.5 | 7.3 |
| Thermal conductivity (Kcal/m · hr · C.) Mean temperature (°C.) | | | | | | | | | |
| 70 | 0.036 | 0.035 | 0.040 | 0.039 | 0.038 | 0.039 | 0.039 | 0.037 | 0.037 |
| 150 | 0.044 | 0.041 | 0.047 | 0.044 | 0.043 | 0.043 | 0.043 | 0.041 | 0.041 |
| 250 | 0.060 | 0.051 | 0.060 | 0.050 | 0.049 | 0.048 | 0.048 | 0.047 | 0.046 |
| 350 | 0.084 | 0.062 | 0.077 | 0.057 | 0.065 | 0.054 | 0.053 | 0.053 | 0.052 |

In Table 2, specimens Nos. 11 and 13 to 18 are according to this invention, while specimens Nos. 10 and 12 are shown for comparison.

Table 2 shows that all the shaped bodies of this invention having the specified content of inactive substance have fully satisfactory strength for use and achieved marked reduction of thermal conductivity over a wide temperature range compared with the specimen Nos. 10 or 12 neither of which had inactive substance.

EXAMPLE 3

Quick lime (36.0 parts, CaO 95%) was hydrated in 432 parts of hot water at 80° C. to obtain a milk lime. To the milk lime were added 39.0 parts of the same siliceous stone powder as used in Example 1, 25.0 parts of the same titanium oxide particles as used therein. Water was added in such amount as to afford a starting slurry containing water in 20 times the amount of the slurry solids. The starting slurry thus prepared was subjected to a hydrothermal synthesis reaction under the same conditions as in Example 1 to produce a slurry of calcium silicate crystals.

The crystal slurries thus obtained were dried at 100° C. for 24 hours and analyzed by an x-ray diffractometer. The analysis revealed the peaks of xonotlite and rutile crystals.

The crystal slurry obtained above was dewatered and dried to a water/slurry solids ratio by weight of 1:1 and placed into a pressure container into which carbon dioxide was forced to an internal pressure of 3 kg/cm$^2$ to conduct reaction for about 30 minutes. To 100 parts (solids) of the slurry was added 7 parts of glass fibers. The mixture was press-shaped on dewatering to produce a shaped body having the same shape as that of the specimens obtained in Example 1. The shaped body thus obtained was treated with a 5 N solution of hydrochloric acid to produce calcium chloride. The calcium chloride was dissolved out by washing with water. The body was then dried at 100° C. for 24 hours. Table 3 below shows the properties of the shaped body thus prepared (specimen No. 20).

Table 3 also indicates the properties of a shaped body (specimen No. 19) prepared for comparison in the same manner as above using the same amount of glass fibers in the shaped body with the exception of not employing titanium oxide particles.

TABLE 3

| Specimen No. | 19 | 20 |
|---|---|---|
| Bulk density (g/cm$^3$) | 0.103 | 0.105 |
| Bending strength (kg/cm$^2$) | 3.8 | 3.1 |
| Rutile content (based on total solids of shaped body, %) | 0 | 33.1 |
| Thermal conductivity (Kcal/m · hr · °C.) Mean temperature (°C.) | | |
| 70 | 0.036 | 0.033 |
| 150 | 0.044 | 0.039 |
| 250 | 0.060 | 0.047 |
| 350 | 0.084 | 0.055 |

EXAMPLE 4

Seven parts of glass fibers was added to 100, parts (solids) of the slurry of xonotlite crystals containing rutile and obtained in Example 3 and then the mixture was press-shaped on dewatering to give a shaped body having the same shape as that of the shaped bodies obtained in Example 1. The shaped body thus obtained was dried and placed into a pressure container under a wet atmosphere. Into the container was forced carbon dioxide to an internal pressure of 3 kg/cm² to conduct reaction for 30 minutes. The shaped body was treated with a 6 N solution of hydrochloric acid and the calcium chloride was dissolved out by washing with water. The shaped body was dried at 100° C. for 24 hours. Table 4 below shows the properties of the shaped body specimen No. 22 thus obtained.

Table 4 also indicates the properties of a shaped body (specimen No. 21) for comparison prepared in the same manner as above using the same amount of glass fibers in the shaped body with the exception of not using titanium oxide particles.

TABLE 4

| Specimen No. | 21 | 22 |
|---|---|---|
| Bulk density (g/cm³) | 0.102 | 0.104 |
| Bending strength (kg/cm²) | 3.7 | 3.0 |
| Rutile content (based on total solids of shaped body, %) | 0 | 33.8 |
| Thermal conductivity (Kcal/m · hr · °C.) Mean temperature (°C.) | | |
| 70 | 0.036 | 0.034 |
| 150 | 0.044 | 0.039 |
| 250 | 0.060 | 0.047 |
| 350 | 0.084 | 0.055 |

We claim:

1. A silica shaped body comprising a multiplicity of interconnected secondary particles of amorphous silica, voids interspersed between the secondary particles, and at least one inorganic inactive substance selected from among carbonaceous substances, nitride and metallic substances, physically united with and enclosed in the secondary particles, the secondary particles being compressed in at least one direction by the shaping pressure, and being each in the form of a substantially globular shell formed of three-dimensionally interlocked primary particles of amorphous silica, the secondary particles having an outside diameter of about 5 to about 150 μm, and the shaped body containing the inactive substance in an amount of about 2 to about 70% by weight based on the total solids of shaped body.

2. A shaped body as defined in claim 1 in which the carbonaceous substance is at least one of active carbon, charcoal, coal, carbon black, graphite, silicon carbide, boron carbide and titanium carbide, the nitride is at least one of silicon nitride, boron nitride and titanium nitride, and the metallic oxide is at least one of iron oxides, titanium oxides, tin oxides, manganese oxides, cerium oxides, zirconium oxides, ilmenite, zircon and chromite.

3. A shaped body as defined in claim 1 which contains the inactive substance in an amount of about 5 to about 60% by weight based on the total solids of shaped body.

4. A shaped body as defined in claim 3 which contains the inactive substance in an amount of about 10 to about 50% by weight based on the total solids of shaped body.

* * * * *